(12) United States Patent
Bellussi et al.

(10) Patent No.: US 8,944,383 B2
(45) Date of Patent: Feb. 3, 2015

(54) AIRCRAFT

(75) Inventors: Enrico Bellussi, Samarate (IT);
Alessandro Scandroglio, Samarate (IT)

(73) Assignee: Agusta S.p.A., Samarate (IT)

( * ) Notice: Subject to any disclaimer, the term of this patent is extended or adjusted under 35 U.S.C. 154(b) by 138 days.

(21) Appl. No.: 12/953,196

(22) Filed: Nov. 23, 2010

(65) Prior Publication Data

US 2011/0147526 A1 Jun. 23, 2011

(30) Foreign Application Priority Data

Nov. 24, 2009 (EP) .................................... 09425480

(51) Int. Cl.
*B64D 15/20* (2006.01)

(52) U.S. Cl.
CPC ..................... *B64D 15/20* (2013.01)
USPC ....................................................... 244/134 F

(58) Field of Classification Search
USPC ....................................................... 244/134 F
See application file for complete search history.

(56) References Cited

U.S. PATENT DOCUMENTS

| | | | | | |
|---|---|---|---|---|---|
| 2,127,823 | A | * | 8/1938 | Leifheit | 340/962 |
| 2,182,868 | A | * | 12/1939 | Haberlin | 89/37.16 |
| 2,221,547 | A | * | 11/1940 | Kollsman | 73/861.68 |
| 2,693,333 | A | * | 11/1954 | Race et al. | 403/104 |
| 3,604,660 | A | * | 9/1971 | Marley | 244/17.11 |
| 2002/0158768 | A1 | | 10/2002 | Severson et al. | |

FOREIGN PATENT DOCUMENTS

| | | | |
|---|---|---|---|
| DE | 653506 | 11/1937 | |
| FR | 2680871 A1 * | 3/1993 | ............. B64D 15/20 |

OTHER PUBLICATIONS http://web.archive.org/web/20040902132433/http://scoutparts.com/products/?view=product&product_id=10443—Sep. 2004.*
European Search Report for EP09425480, dated Mar. 24, 2010, 2 pages.

* cited by examiner

*Primary Examiner* — Isam Alsomiri
*Assistant Examiner* — Justin Benedik
(74) *Attorney, Agent, or Firm* — McCracken & Gillen LLC

(57) ABSTRACT

An aircraft having a fuselage and a detecting device for detecting the presence of ice caused by solidification of supercooled liquid droplets having a characteristic dimension above a threshold value. The detecting device has a preferential first portion for accumulating the droplets, and the preferential first portion is located so as to be visible from inside the fuselage.

12 Claims, 4 Drawing Sheets

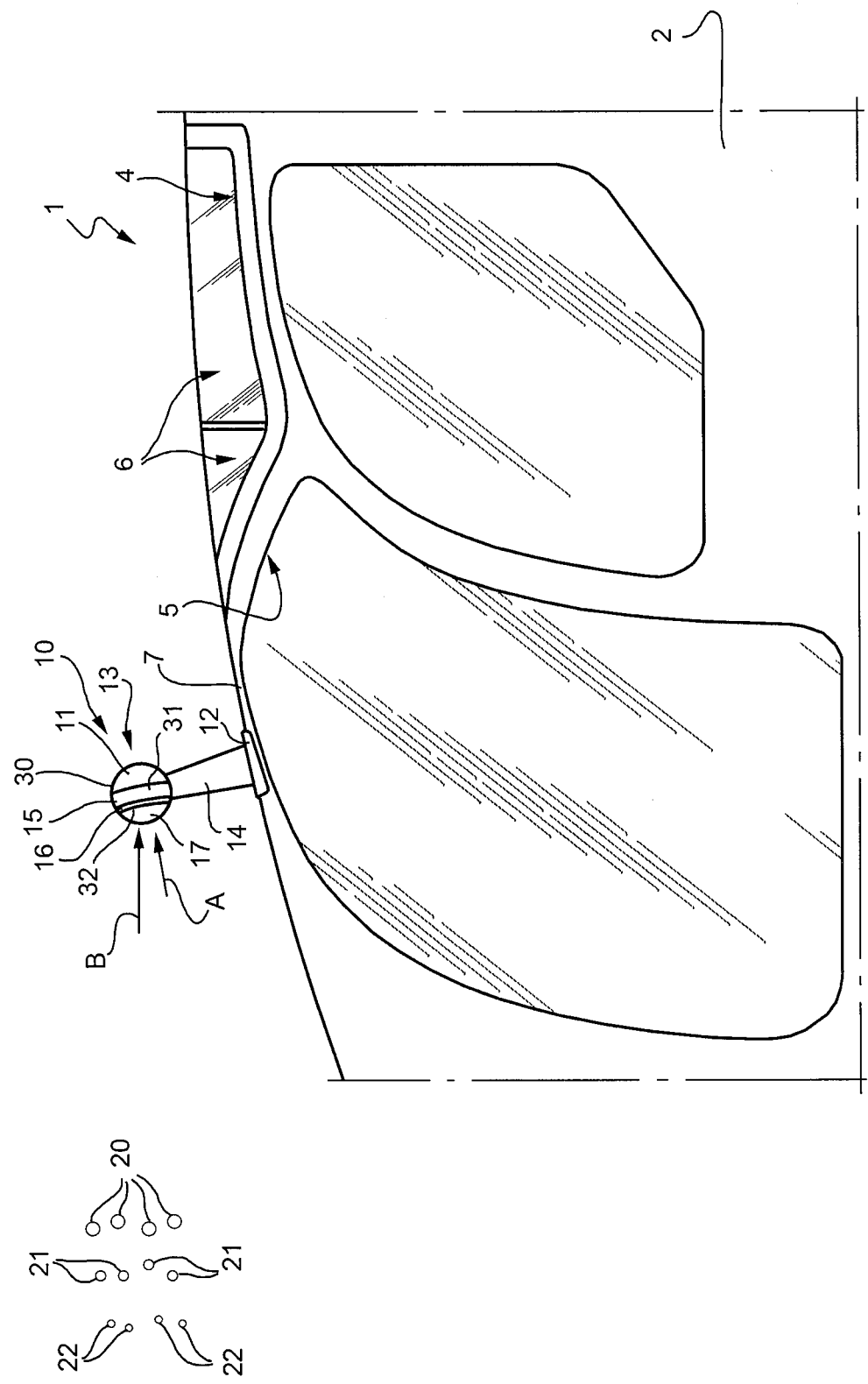

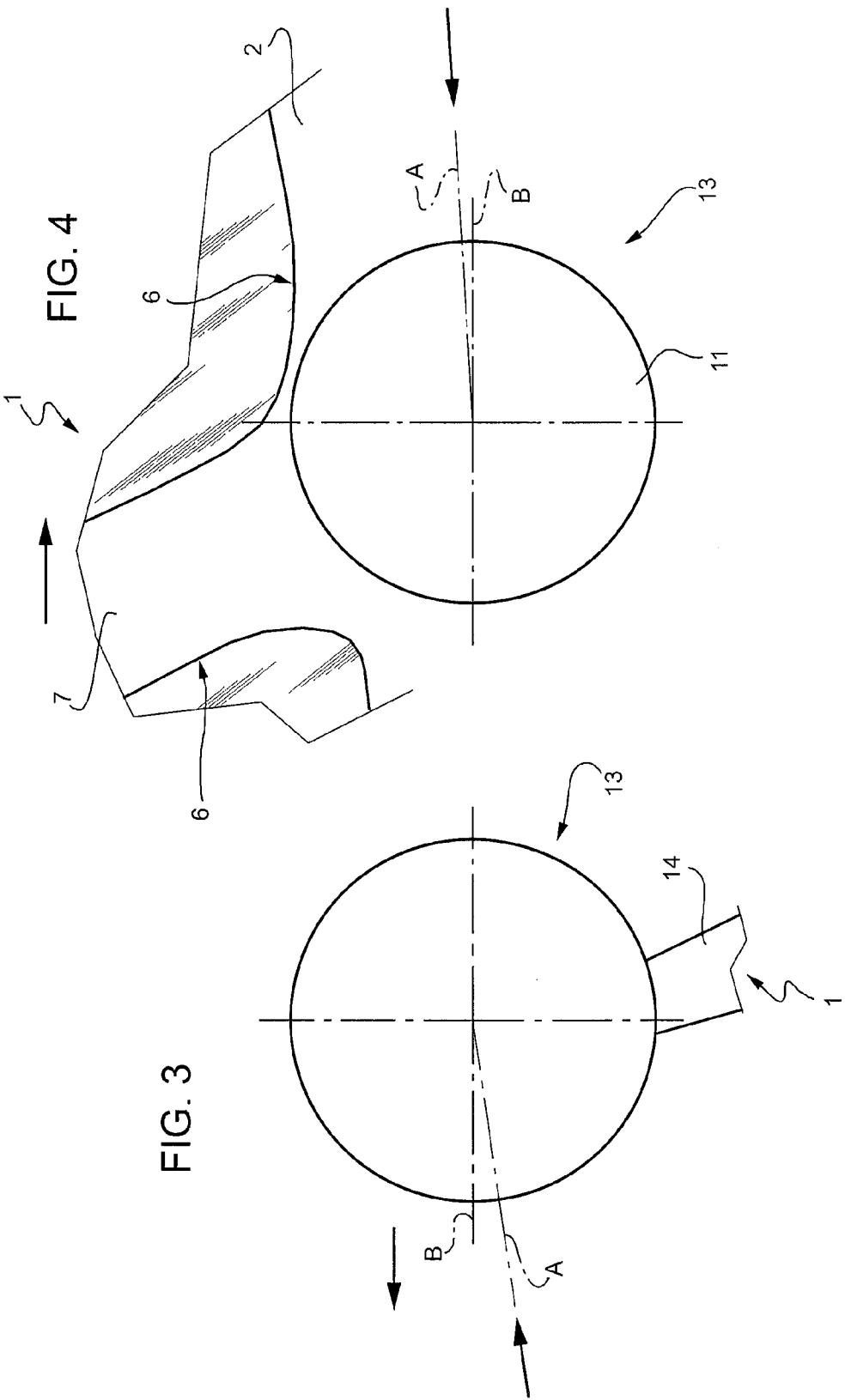

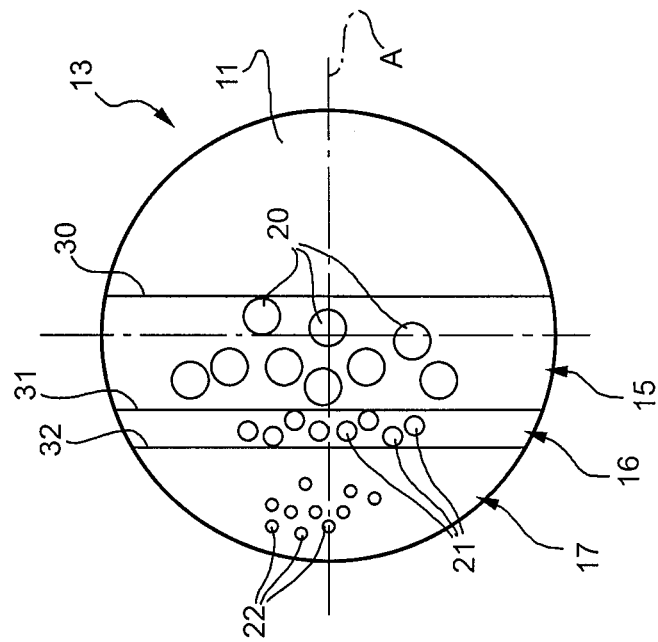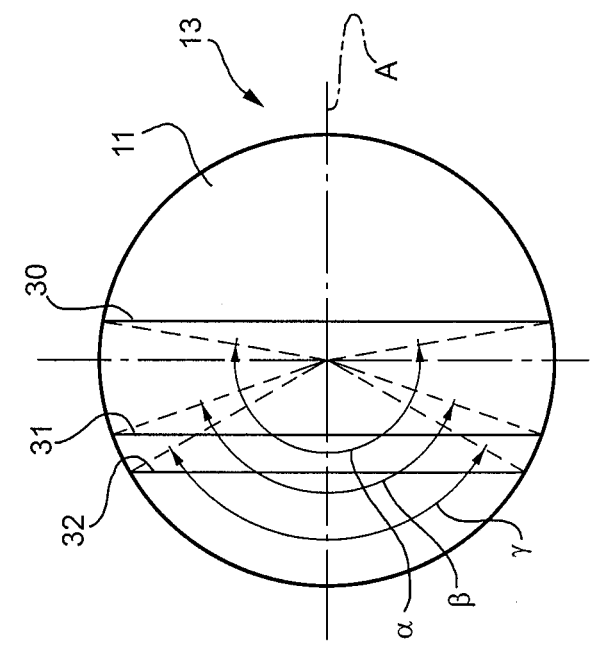

AIRCRAFT

This application claims the benefit of European Patent Application No. 09425480.2 filed Nov. 24, 2009, which is incorporated herein in its entirety.

The present invention relates to an aircraft.

BACKGROUND OF THE INVENTION

The formation of ice on aircraft wing and/or control surfaces can impair the aerodynamic characteristics of the aircraft and, in some cases, even make it extremely difficult to control.

Ice normally forms on aircraft wing and/or control surfaces as the aircraft flies through air containing water droplets, which have remained liquid at temperatures below zero degrees Centigrade, and which are commonly known as supercooled water droplets.

Supercooled water droplets tend to solidify in contact with, and so form a layer of supercooled ice on, aircraft wing and/or control surfaces.

Encountering supercooled water droplets of a diameter below a given, say, 50 micron threshold does not normally pose a serious risk to the aircraft.

This is due to the aircraft wing and/or control surfaces disturbing the airflow, and to the fact that, possessing little motion, most of the water droplets below the threshold diameter tend to pass over, as opposed to striking, the aircraft wing and/or control surfaces. It has been observed that only a small part of the water droplets below the threshold diameter actually come into contact with the leading edges of wing and/or control surfaces.

To remove ice forming on the leading edges of wing and/or control surfaces, aircraft are therefore equipped with ice detecting and deicing devices.

Supercooled water droplets above the threshold diameter, on the other hand, possess greater inertia and so move along paths which are not disturbed to a great extent by interaction of the aircraft wing and/or control surfaces with the air.

As a result, supercooled water droplets above the threshold diameter tend to strike the aircraft wing and/or control surfaces, and so also form ice on parts of the wing and/or control surfaces other than the leading edges, thus endangering the aircraft.

Devices for detecting ice caused by supercooled water droplets above the threshold diameter are known, such as the one described in U.S. Pat. No. 6,296,320.

This substantially comprises a casing fixed to the fuselage; a sensor, in particular a vibrating member, housed in a cavity in the casing; and an element for measuring the vibration frequency of the sensor.

The detecting device also comprises a conduit formed in the casing and having an airflow inlet; and an outlet upstream from the sensor in the airflow direction with respect to the device.

The airflow in the conduit creates vortices about the sensor. Possessing little motion, the supercooled water droplets below the threshold diameter are unable to penetrate the vortices, with the result that most of them fail to come into contact with the sensor. The supercooled water droplets above the threshold diameter, on the other hand, possess sufficient motion to penetrate the vortices and strike and form ice on the sensor. The ice formed alters the natural vibration frequency of the sensor, which is detected by the measuring element.

Another example of a detecting device is described in US-A-2002/0158768, and substantially comprises a first and second ice-sensitive probe; a first and second excitation circuit for exciting the first and second probe respectively; and a device for measuring the natural vibration frequencies of the first and second probe.

The detecting device is designed so that supercooled water droplets above the threshold diameter strike the first probe, whereas those below the threshold diameter and possessing little motion are diverted and do not strike the first probe.

The detecting device is also designed so that both supercooled water droplets above and below the threshold diameter strike, and so form ice on, the second probe.

The first and second excitation circuit excite the first and second probe respectively, and the measuring device determines the first natural vibration frequency of the first probe, on which ice is formed by striking supercooled water droplets above the threshold diameter, and the second natural vibration frequency of the second probe, on which ice is formed by striking supercooled water droplets both below and above the threshold diameter.

From the ratio between the first and second natural vibration frequency, it is possible to determine the presence of supercooled water droplets in the air through which the aircraft is moving.

The above detecting devices are substantially based on determining the natural frequency of a sensor, on which ice is formed by striking supercooled water droplets above the threshold diameter, which means these sensors require an excitation circuit to excite them, and a measuring circuit for measuring their natural frequency.

A need is felt within the industry to equip aircraft with detecting devices capable of rapidly detecting the presence of supercooled water droplets above the threshold diameter, without recourse to the above excitation and measuring circuits.

SUMMARY OF THE INVENTION

It is an object of the present invention to provide an aircraft designed to meet the above requirement cheaply and easily.

According to the present invention, there is provided an aircraft as claimed in the attached claims.

BRIEF DESCRIPTION OF THE DRAWINGS

A preferred, non-limiting embodiment of the present invention will be described by way of example with reference to the accompanying drawings, in which:

FIG. 2 shows a larger-scale, top plan view, with parts removed for clarity, of the FIG. 1 helicopter;

FIGS. 3 and 4 show a top plan and side view of a component part of an ice detecting device of the FIGS. 1 and 2 helicopter;

FIGS. 5 and 6 show the FIGS. 3 and 4 component turned ninety degrees.

DETAILED DESCRIPTION OF THE INVENTION

Figure 1:
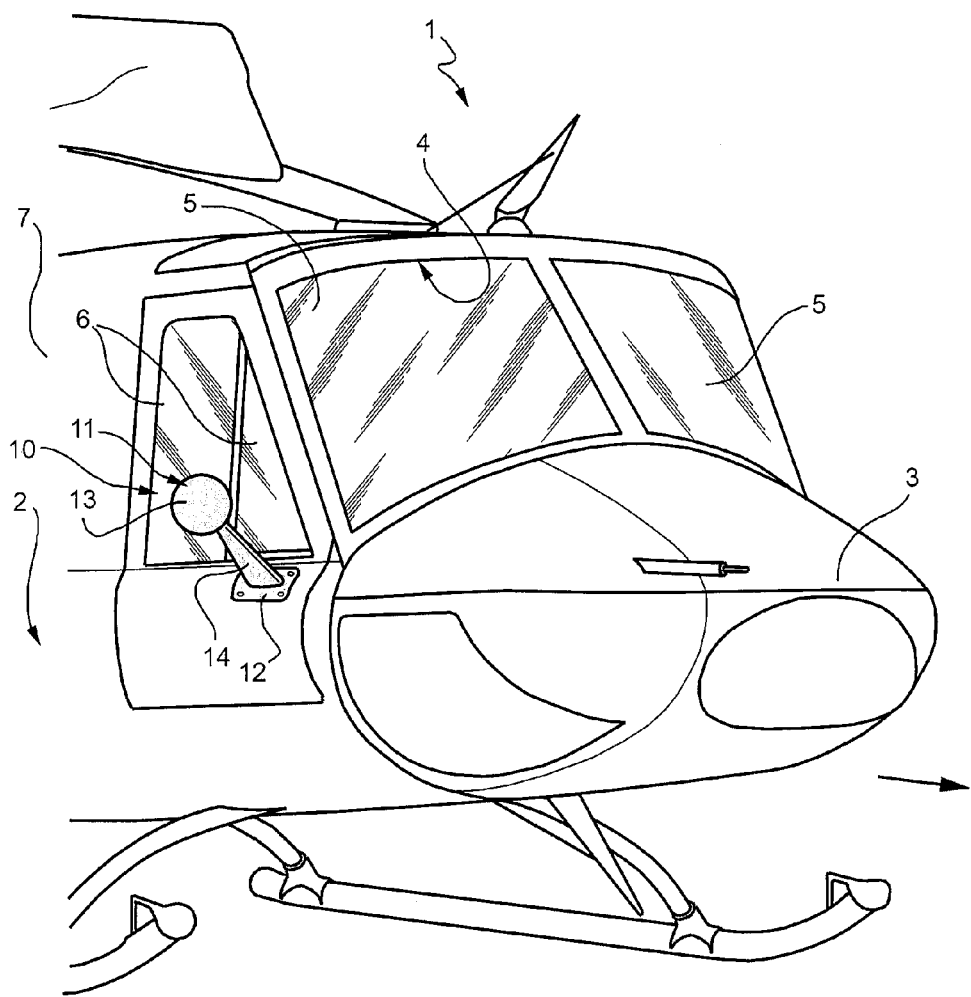
FIG. 1 shows a view in perspective of an aircraft, in particular a helicopter, in accordance with the present invention.

Number 1 in FIG. 1 indicates as a whole an aircraft, in particular a helicopter.

Helicopter 1 substantially comprises a fuselage 2; a main rotor (not shown) on top of fuselage 2; and a tail rotor (not shown).

At opposite ends, fuselage 3 comprises a nose 3, and a tail beam (not shown) supporting the tail rotor.

In the following description, terms such as "front", "top", "rear", "downward" and the like are in no way limiting, and refer to the normal travelling position and direction of helicopter 1 as shown in FIG. 1, i.e. in which the helicopter travels in a horizontal direction, with nose 3 of fuselage 2 preceding the tail beam.

At its front end, fuselage 2 defines a cockpit 4.

Fuselage 2 comprises two front windows 5 at the front of cockpit 4 and to the rear of nose 3; and two pairs of side windows 6 (only one pair shown in FIG. 1) in respective sides 7 of fuselage 2.

Helicopter 1 also comprises a detecting device 10 for detecting the presence of ice caused by solidification of supercooled liquid droplets 20 (FIGS. 2, 6) having a characteristic dimension, in particular a diameter, above a given threshold value. More specifically, droplets 20 are over 50 microns in diameter, and the ice formed by them seriously endangers sustaining and/or controlling helicopter 1.

Detecting device 10 comprises a preferential portion 15 for accumulating droplets 20.

Portion 15 is advantageously visible from inside cockpit 4.

The pilot and/or other crew member can thus visually detect the presence of ice caused by droplets 20.

In other words, detecting device 10 is passive, with no electronic components.

More specifically, detecting device 10 substantially comprises (FIGS. 1 and 2):
- a flange 12 bolted to one side 7 of fuselage 2, below windows 6;
- a main body 13 visible from cockpit 4; and
- an arm 14 having a first end connected to flange 12, and a second end, opposite the first end, supporting body 13.

In the example shown, body 13 is spherical, and has an outer surface 11 swept by the airflow containing supercooled liquid droplets 20, 21 and 22.

More specifically, supercooled liquid droplets 21 are 30-50 microns in diameter, and supercooled liquid droplets 22 are less than 30 microns in diameter.

Surface 11 defines portion 15; a preferential portion 16 for accumulating supercooled liquid droplets 21; and a preferential portion 17 for accumulating supercooled liquid droplets 22.

In the normal travelling direction of helicopter 1, portion 17 is located to the front of portion 16, and portion 16 to the front of portion 15.

Droplets 22 possess very little motion, and so tend to settle and form ice on portion 17.

Droplets 21 possess more motion than droplets 22 and less than droplets 20, and so continue past portion 17 and tend to settle and form ice on portion 16.

Droplets 20 possess more motion than droplets 21 and 22, and so continue past portion 16 and tend to settle and form ice on portion 15.

Portion 15 is bounded between a circle 30 and a circle 31 to the front of circle 30.

Portion 16 is bounded between circle 31 and a circle 32 to the front of circle 31.

Portion 17 is bounded at the rear by circle 32.

The distance between the planes of circles 30 and 31 is greater than the distance between the planes of circles 31 and 32.

In other words, circles 30, 31, 32 define the representation of portions 15, 16, 17 on body 13.

Circles 30, 31, 32 also lie in respective parallel, offset planes.

The respective centres of circles 30, 31, 32 lie along an axis A, which slopes with respect to an axis B of body 13 parallel to the normal travelling direction of helicopter 1 and coincident with the airflow direction with respect to helicopter 1.

As shown in FIGS. 3 and 4, axes A and B meet at the centre of body 13.

The portion of axis A containing the centres of circles 30, 31, 32 lies between arm 14 and axis B (FIG. 3) and above axis B (FIG. 4).

FIG. 5 shows a projection of body 13 and circles 30, 31, 32 in a plane parallel to axis A and perpendicular to the planes of circles 30, 31, 32.

The angle α, at the centre of body 13, subtended by circle 30 in the above plane ranges between 90 and 110 degrees, and is preferably 100 degrees.

The angle β, at the centre of body 13, subtended by circle 31 in the above plane ranges between 65 and 75 degrees, and is preferably 70 degrees.

The angle γ, at the centre of body 13, subtended by circle 32 in the above plane ranges between 55 and 65 degrees, and is preferably 60 degrees.

For easy viewing by the pilot from cockpit 4, portions 15, 16, 17 are of different colours.

More specifically, portion 15 is red, portion 16 yellow, and portion 17 black.

In a first embodiment of detecting device 10, body 13 is made of composite material to reduce the overall weight of helicopter 1.

In a second embodiment of detecting device 10, body 13 comprises a heating element (not shown) to deice it, and is made of metal.

In actual use, helicopter 1 travels in a direction parallel to axis B, and may fly through clouds containing supercooled liquid droplets 20, 21, 22, which contact and forms ice on helicopter 1, and in particular on detecting device 10.

As it moves forward, helicopter 1 creates an airflow that causes droplets 20, 21, 22 to strike body 13 of detecting device 10.

Possessing little motion, droplets 22 settle mostly and form ice on black portion 17.

Droplets 21 possess more motion than droplets 22, and are therefore able to reach portion 16, so most of droplets 21 settle and form ice on yellow portion 16.

Droplets 20 possess more motion than droplets 21 and 22, and are therefore able to reach portion 15, so most of droplets 20 settle and form ice on red portion 15.

The pilot or other crew member can determine the presence of ice caused by droplets 20 by simply glancing at body 13 and checking for ice on portion 15.

On doing so, and confirming the presence of ice caused by droplets 20, the pilot flies helicopter 1 out of the cloud.

The advantages of helicopter 1 according to the present invention will be clear from the above description.

In particular, the pilot or other crew member can determine the presence of ice caused by droplets 20 by simply checking for ice on portion 15.

Detecting device 10 therefore requires no sensors or conditioning circuits, is therefore totally passive, and has no electronic parts.

Finally, in the event the aircraft is a helicopter, the aerodynamic action of the main rotor diverts the airflow, which flows at an inclined angle and parallel to axis B. In which case, because axes A and B are inclined with respect to each other, portions 15, 16, 17 are still struck by droplets 20, 21, 22, which means operation of detecting device 10 is no way impaired by diverting the airflow.

Clearly, changes may be made to the aircraft without, however, departing from the scope of the present invention.

In particular, the aircraft may be an aeroplane or convertiplane.

In the event the aircraft is an aeroplane, axes A and B need not be inclined with respect to each other.

Also, body 13 may comprise a semispherical front portion defining portions 15, 16, 17; and a cylindrical rear portion.

The invention claimed is:

1. A helicopter comprising:
   a fuselage; and
   a detecting device for detecting the presence of ice caused by solidification of first supercooled liquid droplets having a characteristic first dimension above a threshold value; said detecting device comprising a first portion for accumulating said first droplets;
   said first portion being located so as to be visible from inside said fuselage;
   said detecting device comprising a second portion for accumulating second supercooled liquid droplets having a characteristic second dimension below said threshold value;
   said second portion being visually distinct from said first portion and located so as to be visible from inside the fuselage;
   said detecting device further comprising a body in turn comprising a surface swept by said first droplets and said second droplets;
   said surface of said body defining said first and said second portion;
   said second portion being located to the front of said first portion in the normal travelling direction of said helicopter;
   wherein said first portion is bounded between a first and second closed curve lying respectively in a first and second plane distinct from each other; and in that said second portion is bounded, on the side facing said first portion, by a third closed curve lying in a third plane distinct from said first and second plane;
   said body being spherical and being fixedly attached to said fuselage so that the body does not move relative to said fuselage;
   said surface comprising at least a spherical portion defining said first and second portion;
   said first, second, and third closed curves being respectively a first, a second, and a third circle having respective centers along a common first axis;
   said helicopter further comprising a support projecting from said fuselage and supporting said body at the opposite end to said fuselage;
   said support being fixedly attached to said fuselage so that the support does not move relative to said fuselage, the support comprising:
      a flange bolted to one side of said fuselage such that the flange does not move relative to said fuselage; and
      an arm connected to said flange and supporting said body;
   wherein said body has a second axis of symmetry parallel to said normal travelling direction of the helicopter; and
   wherein said first and second axis are inclined with respect to each other.

2. A helicopter as claimed in claim 1, wherein said detecting device comprises a third portion defined by said surface and defining a portion for accumulating third supercooled liquid droplets having a characteristic third dimension between said first and second dimension;
   said third portion being interposed between said first and second portion.

3. A helicopter as claimed in claim 2, wherein said body has a second axis of symmetry parallel to said normal travelling direction of the helicopter; and wherein said first and second axis are inclined with respect to each other.

4. A helicopter as claimed in claim 1, wherein said surface defines also said third portion.

5. A helicopter as claimed in claim 4, wherein said body has a second axis of symmetry parallel to said normal travelling direction of the helicopter; and wherein said first and second axis are inclined with respect to each other.

6. A helicopter as claimed in claim 1, wherein said detecting device comprises means for heating said body.

7. A helicopter as claimed in claim 6, wherein said body is made of metal.

8. A helicopter as claimed in claim 7, wherein said body has a second axis of symmetry parallel to said normal travelling direction of the helicopter; and wherein said first and second axis are inclined with respect to each other.

9. A helicopter as claimed in claim 6, wherein said body has a second axis of symmetry parallel to said normal travelling direction of the helicopter; and wherein said first and second axis are inclined with respect to each other.

10. A helicopter as claimed in claim 1, wherein said body is made of composite material.

11. A helicopter as claimed in claim 10, wherein said body has a second axis of symmetry parallel to said normal travelling direction of the helicopter; and wherein said first and second axis are inclined with respect to each other.

12. A helicopter as claimed in claim 1, wherein said body has a second axis of symmetry parallel to said normal travelling direction of the helicopter; and wherein said first and second axis are inclined with respect to each other.

* * * * *